United States Patent [19]

Jeal

[11] 4,003,288
[45] Jan. 18, 1977

[54] TUBULAR RIVET

[75] Inventor: Harvey Philip Jeal, Stevenage, England

[73] Assignee: Aerpat A.G., Zug, Switzerland

[22] Filed: Aug. 25, 1975

[21] Appl. No.: 607,444

Related U.S. Application Data

[60] Continuation of Ser. No. 439,030, Feb. 4, 1974, abandoned, which is a division of Ser. No. 260,832, June 8, 1972, abandoned, which is a division of Ser. No. 53,937, July 10, 1970, abandoned.

[30] Foreign Application Priority Data

July 28, 1969 United Kingdom ............ 37689/69

[52] U.S. Cl. .................................... 85/77; 72/391; 72/406; 85/82
[51] Int. Cl.² ........................................ F16B 19/10
[58] Field of Search .................... 85/77, 82, 78, 79; 72/391, 406

[56] References Cited

UNITED STATES PATENTS

| 2,146,461 | 2/1939 | Bettington | 85/78 X |
| 2,150,361 | 3/1939 | Chobert | 85/77 |
| 2,344,128 | 3/1944 | Cherry et al. | 85/77 |
| 2,366,965 | 1/1945 | Johnson | 85/82 |
| 2,803,984 | 8/1957 | Swenson | 85/77 |
| 3,232,162 | 2/1966 | Ketchum | 85/77 |
| 3,424,051 | 1/1969 | Baugh | 85/77 |
| 3,438,301 | 4/1969 | Mattioli | 85/77 |

FOREIGN PATENTS OR APPLICATIONS

| 531,125 | 12/1940 | United Kingdom | 85/77 |
| 860,123 | 2/1961 | United Kingdom | 85/77 |

OTHER PUBLICATIONS

A.P.C. Application of Chobert, Serial No. 190,868, published 6/15/43.

Primary Examiner—Roy D. Frazier
Assistant Examiner—Rodney H. Bonck
Attorney, Agent, or Firm—Oblon, Fisher, Spivak, McClelland & Maier

[57] ABSTRACT

A tubular rivet for blind placing comprises a cylindrical body 21, an externally thickened tail portion 34, and a head 22 with an internal taper 26 and external taper 25. The rivet is placed by pulling through it the head 42 of a mandrel, the head having a relatively steep taper 43 at the leading end.

10 Claims, 19 Drawing Figures

TUBULAR RIVET

This is a continuation, of application Ser. No. 439,030, filed Feb. 4, 1974, now abandoned, which is a division of Ser. No. 260,832 filed June 8, 1972, now abandoned, which is a division of Ser. No. 53,937, filed July 10, 1970 now abandoned.

The invention relates to a tubular rivet, i.e., a rivet which has a bore extending completely through it. In particular, the invention relates to a blind tubular rivet which can be placed by means of a pull-through mandrel with an enlarged head which is drawn completely through the bore of the tubular rivet to place it. The term "blind rivet" is well understood to mean one which can be placed by access to one side only of workpieces to be riveted thereby. The invention also relates to such a mandrel for use in placing blind tubular rivets. The invention also relates to methods of placing such rivets. The invention also relates to the combination of such a rivet and mandrel.

Such rivets and mandrels and their use in blind riveting are well known. Usually, a plurality of rivets are loaded onto a mandrel, and the mandrel head is then pulled through successive rivets in turn, thereby allowing the placing of successive rivets in quick repetition.

The invention provides a method of placing a headed blind tubular rivet having a bore of substantially uniform diameter, in which there is pulled through the rivet bore, in the direction towards the head of the rivet, the enlarged head of a mandrel, the maximum diameter of which is greater than the diameter of the rivet bore, the leading end of the mandrel head being in the form of a relatively steep taper having an included angle of not less than about 45°.

Preferably the maximum diameter of the mandrel head is provided by a portion of uniform diameter at the wider end of the taper.

The tail end portion of the rivet remote from the head thereof may be of increased external diameter. Preferably the said portion of increased diameter is tapered at the end thereof which is nearer the rivet head to meet the external diameter of the portion of the rivet intermediate the head and the said portion of increased diameter.

The invention also provides a blind tubular rivet comprising an elongated shank and a radially enlarged head at one end of the shank, in which a portion of the shank adjacent the head tapers radially outwardly towards the rivet head, the taper being both external and internal and such that the thickness of the wall of the said tapered portion of the shank is substantially the same as the thickness of the wall of at least a major part of the length of the remainder of the shank.

Preferably the included angle of the said taper is about 40° on 50°. Preferably the internal taper of the said portion of the shank is continued through the head of the rivet. In a preferred embodiment, the tail end portion of the shank remote from the head has an increased external diameter, and the said portion of increased external diameter is tapered at that end which is towards the rivet head to meet the external diameter of the portion of the shank intermediate the tail end portion and the head. It is preferred that the taper is relatively steep and has an included angle in the range 45° to 100°.

The invention also provides a pull-through mandrel, comprising a stem and an enlarged head, for use in placing a blind tubular rivet, in which mandrel that end of the enlarged head which faces towards the stem is in the form of a relatively steep taper with an included angle of not less than about 45°. Preferably the maximum diameter of the head is provided by a portion of uniform diameter.

The invention also provides the combination of a blind tubular rivet comprising an elongated shank and a radially enlarged head at one end of the shank, and a pull-through mandrel comprising a stem and an enlarged head, the mandrel being capable of blind placing of the rivet by the pulling of the mandrel head completely through the bore of the rivet in the direction towards its head thereby to expand radially at least part of the rivet, that end of the mandrel head which faces towards the stem being in the form of relatively steep taper having an included angle of not less than about 45°.

Some specific embodiments of the invention will now be described by way of example and with reference to the accompanying drawings, in which:-

In FIGS. 1 – 9 and 11 – 19 all parts are shown in section, except the mandrel which is shown in elevation. Like parts are indicated by like reference numerals in all figures.

Figure 1:
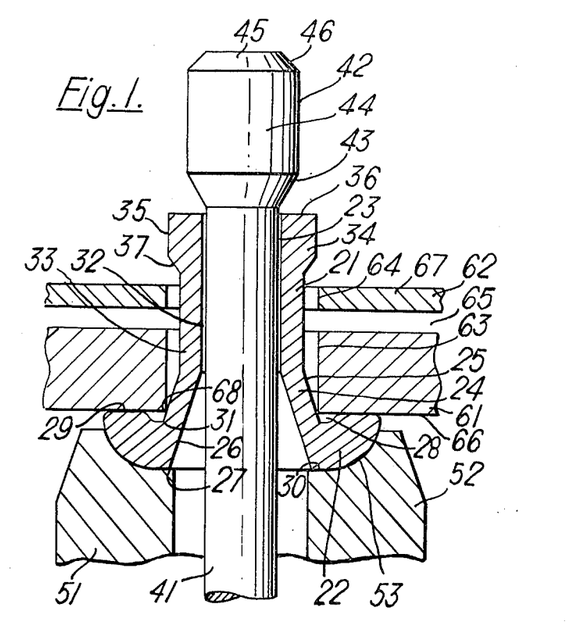
FIGS. 1 – 9 illustrate successive stages in the placing of a blind tubular rivet by means of a pullthrough mandrel, in sheets of relatively large grip (i.e. total thickness)
Figure 11:
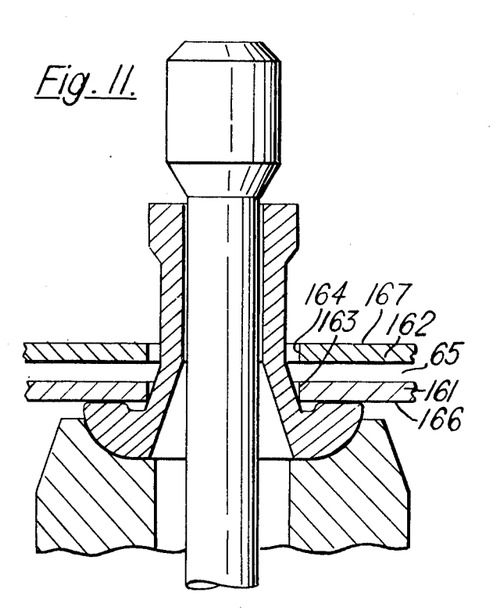
FIGS. 11 – 19 illustrate successive stages in the placing of a similar rivet by a similar mandrel in sheets of relatively small grip.

The example rivet in its undeformed state is shown in FIGS. 1 and 11. Generally it comprises a shank 21 with a radially enlarged head 22 at one end (the head end), with a bore 23 extending completely through the rivet. A portion 24 of the shank adjacent the head tapers outwardly towards the head. This tapered portion 24 has an externally tapered outer surface 25 and an internally tapered surface 26. The included angle of the internal and external tapered faces 25 and 26 is the same (in this example about 40°), so that the thickness of the wall of the tapered portion 24 of the rivet shank is constant along its length and is also substantially similar to the thickness of the wall 33 of the shank over the major part of the remainder of its length. The internal tapered surface 26 is continued through the thickness of the head of the rivet to meet the outer end face of the head along a circular edge 27. The underside of the head of the rivet (i.e., the side facing towards the shank 21 — in the accompanying drawings the rivet is shown head lowermost) is formed with an annular recess 28 surrounded by an annular flat face 29. The external tapered surface 25 of the shank meets this recess 28 along a circle 31 which, in this example, is slightly larger in diameter than the circle 27 along which the internal tapered face 26 meets the end face 30 of the rivet head.

Apart from the internally tapered face 26, the remainder of the bore 23 of the rivet consists of a portion 32 of uniform diameter extending from the narrow end of the internal taper 26 through to the tailmost end (i.e., the end remote from the head) of the rivet. The majority of the length of the rivet shank 21, apart from the tapered portion 24 adjacent the head, consists of a portion 33 of uniform wall thickness. The tailmost portion 34 of the rivet shank is of larger external diameter, so that it provides a portion of increased wall thickness. This tailmost portion 34 has an external surface comprising a cylindrical portion 35 of uniform diameter joining the tail end face 36 of the rivet shank which is perpendicular to the axis of the rivet. The portion 35 of uniform diameter is joined to the exterior surface of the intermediate portion 33 of the shank by means of a relatively steeply tapered surface 37. In this example, the included angle of this taper is about 75°. The axial length of the thickened portion 34 is about twice the wall thickness of the intermediate portion 33 of the shank. In this example, the external diameter of the thickened portion (i.e., the diameter of the cylindrical surface 35) is substantially identical to the diameter of the circle 27 along which the internal taper 26 meets the rivet head face 30.

FIGS. 1 - 9 and 11 - 19 also illustrate a pullthrough mandrel, in accordance with the invention, for placing the example rivet just described. The mandrel comprises an elongated stem 41 having a diameter which is a running clearance within the bore 32 of the rivet. Formed integrally with this stem is a head 42 comprising a relatively steeply tapered portion 43, the narrow end of which meets the exterior surface of the stem 41. In this example, the mandrel head also includes a further portion 44 of uniform diameter, continuous with the wide end of the tapered portion 43. The end of the head remote from the stem has a flat face 45 perpendicular to the length of the stem and, in this example, there is provided a further tapered portion 46 joining the flat end face 45 to the end of the cylindrical portion 44 which is remote from the stem. In this example, the axial length of the portion 44 of uniform diameter is approximately equal to its diameter. The diameter of the portion 44 is of course larger than the internal diameter of the rivet bore 32 in order that the head can expand the rivet. In this example, it is less than the external diameter of the intermediate portion 33 of the rivet shank. In this example, the included angle of the leading tapered portion 43 of the mandrel head is about 60°, and the included angle of the tapered face 46 at the back of the mandrel head is 90°.

In use, the mandrel and rivet are employed in conjunction with a riveting gun of the type well known in connection with the blind repetition rivet process widely employed under the Registered Trade Mark "Chobert." Such a gun, and its manner of operation, are well known and will not be further described in this specification. In FIGS. 1 - 9 and 11 - 19, the tips of the split nosepiece of the riveting gun are indicated at 51 and 52, the ends of the tips having a recess 53 complementary in shape with the head of the rivet to form an abutment for the rivet whilst the head of the mandrel is drawn through the bore of the rivet to expand its shank.

FIGS. 1 - 9 illustrate the use of the example rivet and mandrel according to the invention to rivet together two metal sheets 61, 62 having aligned circular holes 63, 64 in them. It should be noted that the diameter of the holes 63 and 64 is chosen appropriately to be just large enough to allow the thickened tail end 34 of the rivet to pass through them. In this example, the sheets 61 and 62 are separated by a slight gap 65, which is a situation which often occurs in practice. As illustrated in FIG. 1, the particular rivet chosen to fasten together these sheets in this situation is such that the axial distance from the annular flat face 29 on the underside of the rivet head to the tapered face 37 of the thickened end of the rivet is not less than the total thickness between the outside face 66 of the sheet 61 and the opposite outside face 67 of the sheet 62.

As illustrated in FIG. 1, the tail end of the rivet, with the mandrel head protruding beyond it, is inserted by the gun operator through the aligned holes 63, 64, until the annular underface 29 of the rivet head is in contact with the nearer outside face 66 of the sheet. It will be noticed from FIG. 1 that in this position the end 68 of the hole 63 in the face 66 of the sheet 61 is touching all the way round the external tapered surface 25 on the rivet shank adjacent the head. This external tapered surface 25 has the effect of centering the head of the rivet with respect to the circular aperture 63 as the tapered surface enters the end 68 of the hole 63. The riveting gun is then held firmly by the operator in position to keep the annular face 29 under the rivet head in contact with the surface 66 of the sheet, and the gun is actuated (it will usually be pneumatically powered) to progressively retract the mandrel 41 with respect to the nose-piece, so that the mandrel head 44 is pulled completely through the bore of the rivet from its tail end to its head end, against the reaction on the head of the rivet provided by the recess 53 in the gun nose-piece. FIGS. 2 to 9 illustrate successive stages in the progressive deformation of the rivet during this process.

Figure 2:
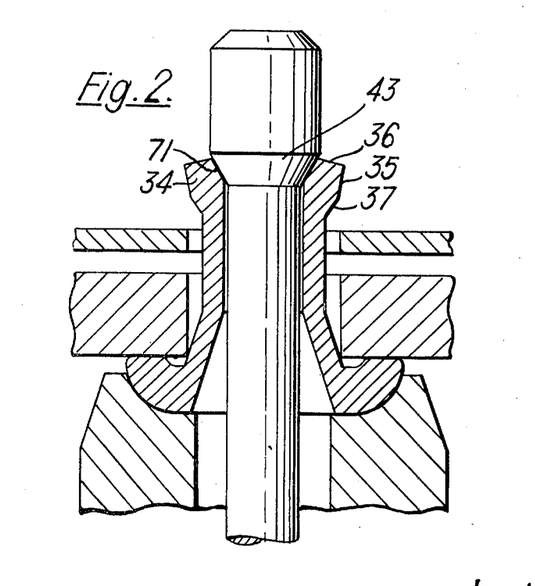

In FIG. 2 the leading tapered face 43 of the mandrel head has started to enter the thickened portion 34 at the rivet tail. This tapered surface 43 on the mandrel head has formed a mating tapered surface 71 inside the tail of the rivet. The annular end face 36 of the rivet tail is tilted outwardly, and the cylindrical face 35 of the tail end of the rivet is deformed into a shallow taper. The originally tapered face 37 of the end portion 34 of the rivet tail is also distorted to a steeper taper.

Figure 3:
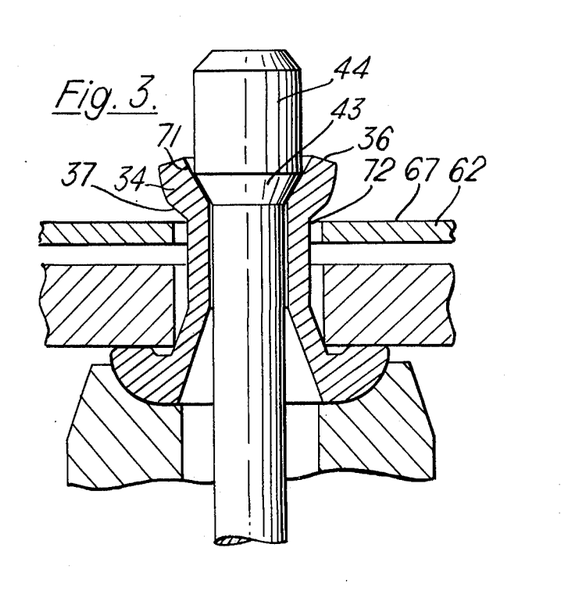

In FIG. 3, the mandrel head has entered still further into the rivet tail, and it will be noted that the tapered surface 71 inside the tail end of the rivet bore, formed by the tapered surface 43 of the mandrel head, projects behind the widest end of the tapered surface 43 and surrounds the leading end of the cylindrical surface 44 of the mandrel head. In particular, the widest part of the tapered surface 71 in the rivet tail bore is larger in diameter than the widest part of the tapered surface 43 on the mandrel head which has formed the tapered surface 71. This is clearly illustrated in FIG. 3. The explanation is believed to be that the part of the rivet tail outside the rear sheet is unsupported radially, and it is sufficiently stiff that, after the mandrel taper 43 has passed beyond a given zone therealong, that zone does not contract on to the mandrel head surface 44 but remains substantially straight (when considered in section) in the outwardly sloping direction which has been given to it by the mandrel taper 43, and continues to expand radially to a certain extent as the taper surface 43 moves away from it. The position of the leading edge of the deformation on the exterior of the rivet shank is indicated by the reference numeral 72, and it is travelling towards the head of the rivet in advance of the leading end of the mandrel head. In FIG. 3, it is just about level with the rear surface 67 of the sheet 62.

Figure 4:
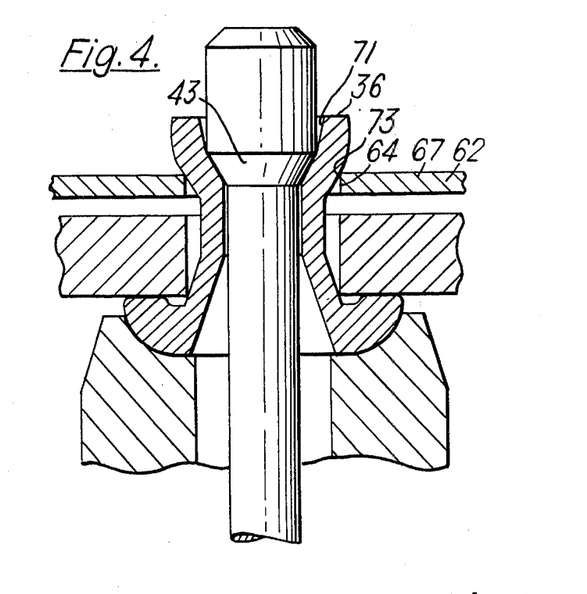

In FIG. 4, the mandrel head has entered still further into the rivet shank, and the leading tapered end 43 of the head is now beyond the original position of the tapered surface 37 of the tail end of the rivet. The radially expanded wall of the rivet shank has met the blind end of the hole 64 in the rear sheet 62 at the rear face 67, the circle of contact being indicated by the reference numeral 73 in FIG. 4. The tailmost end of the rivet shank has somewhat returned towards its original configuration from the configuration shown in FIG. 3. In other words, the tapered surface 71 formed inside the tailmost end of the rivet bore has returned towards a cylindrical or parallel shape, i.e., its angle of taper has been decreased. The tail end face 36 of the rivet shank is once again substantially flat and perpendicular to the rivet axis. The explanation of this reversal of movement of the tailmost end 34 of the rivet shank is believed to be that this part of the rivet shank has, in effect, been pivoted about its circle of contact 73 to a certain extent, by the thrust of the leading tapered face 43 of the mandrel head on the portion of the rivet bore wall which is ahead of the position of the circle of contact 73. It should also be noticed in FIG. 4 that whereas in FIGS. 2 and 3 the length of the rivet from its head to its tail end was very little changed from its initial length as illustrated in FIG. 1, in FIG. 4 the length of the rivet has decreased. In general, decrease in the length of the rivet during the placing process may be due to two different mechanisms. (a) The carrying of material of the rivet from the tail end towards the head end thereof by the mandrel head as it passes through the rivet. (This mechanism is unlikely to come into effect until the mandrel head enters the hole in the sheets so that the walls of the hole in the sheets provide resistance to radial expansion of the rivet shank out of the way of the mandrel head.) (b) Axial contraction of the tubular rivet shank due to radial expansion thereof.

Figure 5:
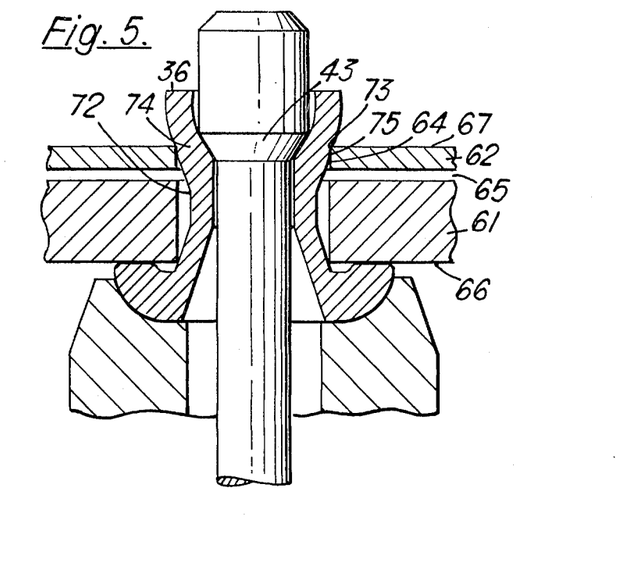

In FIG. 5, the advance of the mandrel head into the rivet shank has caused the expansion of the rivet shank to pull the rear sheet 62 nearer to the front sheet 61, thus reducing the gap 65 between them. It should be noted that the distance along the exterior of the rivet shank between the tail end face 36 of the rivet, and the circle of contact 73, has not altered. Thus the reduction in the distance between the rear face 67 and the front face 66 is due to a reduction in the axial length of the rivet shank between these two faces. It will be seen that the leading edge 72 of the deformation in the exterior of the rivet shank has now advanced to a position within the front sheet 61. The thickness of the rivet shank at a position slightly tailwards of this position, and indicated by the reference numeral 74 in FIG. 5, has noticeably increased in thickness. The wider end of the tapered surface 43 on the mandrel head has not yet reached the plane of the rear face 67 of the rear sheet 62, although the tapered surface 43 is substantially within the thickness of the rear sheet 62. At a position indicated by reference numeral 75 in FIG. 5 the material of that part of the rivet shank opposite the tapered surface 43 of the mandrel head is in contact with the wall of the hole 64 in the rear sheet 62, but no material of the rivet has entered the gap 65 between the sheets. The deformation in the exterior of the rivet shank has not in fact yet reached the inner face of the rear sheet 62 which bounds one side of the gap 65, as is illustrated in FIG. 5.

Figure 6:
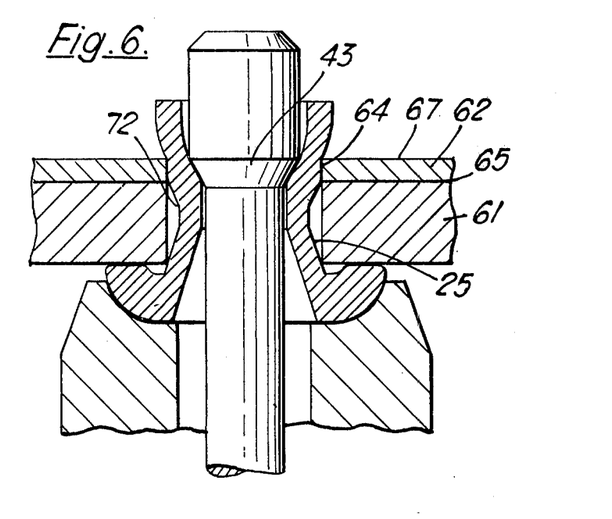

FIG. 6 shows the position where the sheet 62 has been brought into contact with the sheet 61 by the progressive deformation of the rivet shank. The portion of the external wall of the rivet shank which is in contact with the wall of the hole 64 in sheet 62 has just reached the interface between sheets 61 and 62 (indicated from FIg. 6 onwards by the numeral 65, for the sake of convenience of comparison between different Figures). Thus material from the rivet shank does not enter into the gap 65 between the sheets before the sheets are clenched together by the rivet. In the position illustrated in FIG. 6, the wider end of the tapered surface 43 of the mandrel head is level with the rear face 67 of the sheet 62. The leading position 72 of the deformation of the outside of the rivet shank is approaching the narrow end of the external taper face 25 on the rivet shank.

Figure 7:
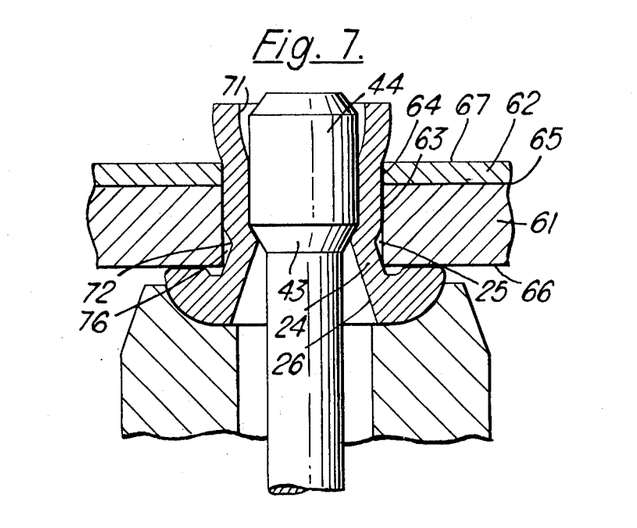

In FIG. 7, the mandrel head has advanced through the rivet bore still further, to the point where the leading tapered face 43 of the mandrel head has entered the tapered portion 24 of the rivet shank, and the leading edge 72 of the deformation on the exterior of the rivet shank has moved part of the way along the external tapered surface 25. The material of the rivet shank has been deformed outwardly behind the leading face of the mandrel head, and is in contact with the wall of the holes 63, 64 through the sheets from a position approximately opposite the wider end of the tapered face 43 of the mandrel head right back to the rear end of the hole 64 at the rear face 67 of the sheet 62. At this stage, there remains a small annular gap 76 of roughly triangular cross-section between the external tapered face 25 on the rivet shank adjacent the head and that portion of the wall of the hole 63 near the front face 66 of sheet 61. The leading, narrower part of the tapered leading face 43 of the mandrel head has emerged into the flare defined by the internal tapered face 26 of the rivet shank, whilst the wider part of the face 43 on the mandrel head is still in contact with the rivet shank. The deformed material of the inside of the rivet shank is also in contact with the cylindrical surface 44 of the mandrel head, as far back as a position level with the rear face 67 of the rear sheet 62 where the flared surface 71, now distorted from its original conical shape, forms the inside surface of a blind head on the rivet.

Figure 8:
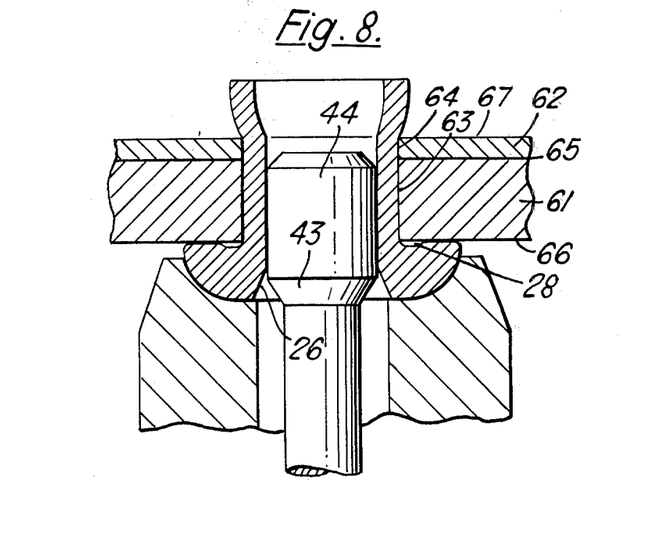

In FIG. 8, the wider end of the tapered surface 43 of the mandrel head, and the leading end of the cylindrical surface 44, have emerged into the flare at the head end of the rivet bore defined by the internally tapered surface 26. It will be seen, however, that this flare is very much shorter than in FIG. 7. This is because it has largely been filled by material from the shank of the rivet pushed along by the mandrel head in its passage through the rivet bore. It will also be noted in FIG. 8 that the annular depression 28 on the underface of the rivet head has been reduced in size, due partly to the movement of material of the rivet shank towards the head end of the rivet, and partly to the compression exerted on the rivet head by the gun nose-piece reaction to the mandrel pull. The result is that the portion of the rivet shank wall adjacent to the rivet head, i.e., between the remains of the shortened internal tapered surface 26, and the annular depression 28, as illustrated in FIG. 8, has substantially increased in thickness and thus in strength. The deformed exterior surface of the rivet shank is firmly in contact with the walls of the holes 63 and 64 throughout the combined length of the holes, from the front face 66 to the rear face 67 of the sheets.

Figure 9:
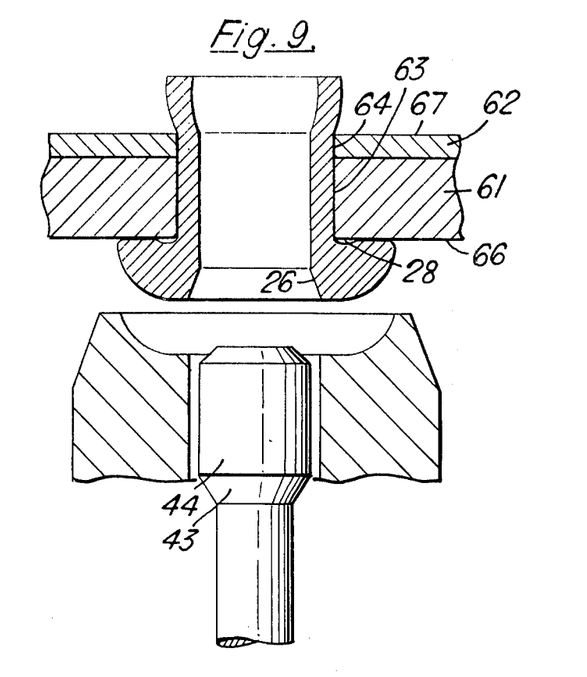

FIG. 9 illustrates the mandrel completely withdrawn from the bore of the placed rivet, the jaws of the riveting tool also being removed from the head of the placed rivet. No further deformation of the rivet has taken place between the position of FIG. 8 and FIG. 9. The resulting placed rivet illustrated in FIG. 9 has securely fastened the two sheets together.

FIGS. 11 – 19 illustrate successive stages in the placing of an identical rivet, by means of the same riveting tool and mandrel, in sheets which have a total thickness very much less than those in the example of FIGS. 1 – 9. In FIGS. 11 – 19, the same reference numerals as in FIGS. 1 – 9 are used for the same parts and features, with the exception that the reference numerals indicating the two sheets and their various parts are raised by 100 with respect to the reference numerals of FIGS. 1 – 9. The method of use of the mandrel and riveting gun in placing the rivet is the same as described with reference to FIGS. 1 – 9, the only difference between the two examples being the total thickness of the sheets and the consequent differences in the way in which the rivet is deformed.

Figure 12:
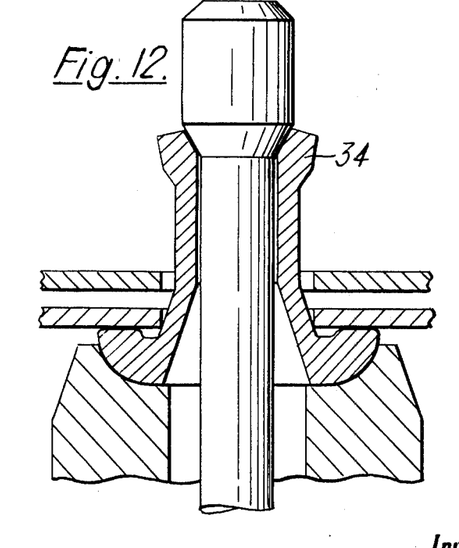
Figure 13:
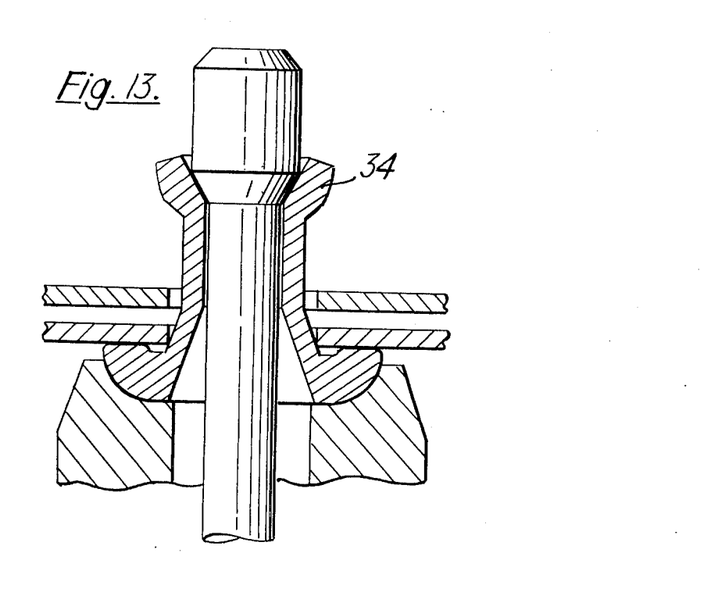
Figure 14:
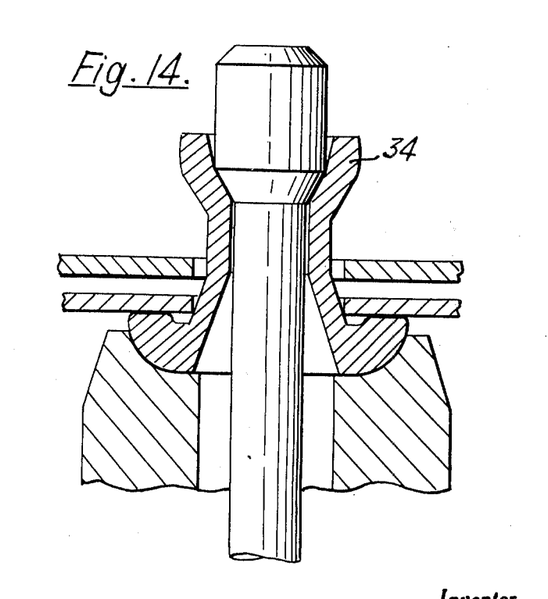

FIG. 11 shows the rivet in its undeformed state, and the initial deformation of the rivet, shown in FIGS. 12, 13 and 14, is the same as the initial deformation of the rivet shown in FIGS. 2, 3 and 4 respectively. In other words, the shape of the rivet shown in FIG. 14 is the same as the shape of the rivet shown in FIG. 4.

Figure 15:
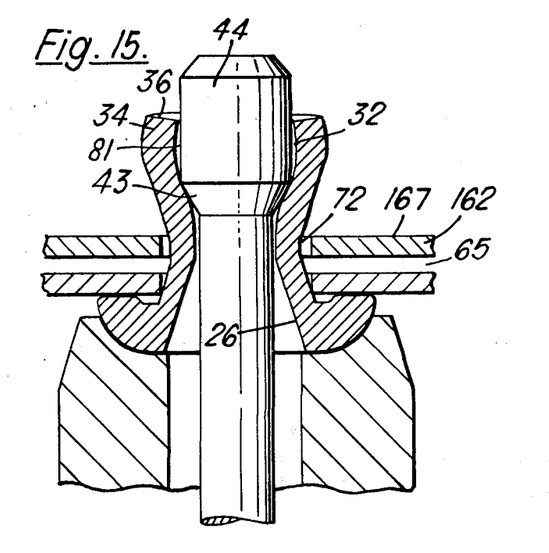

In FIG. 15 the mandrel head has advanced still further into the rivet, but the advancing deformation in the rivet shank has not yet reached the rear face 167 of the rear sheet 162. It will be noticed from FIG. 15 that, whereas at an earlier stage in the advance of the mandrel shown in FIG. 13, the tail end portion 34 of the rivet shank was deformed so that it was tapered in the same direction as the taper 43 on the leading end of the mandrel head, in the later stage of deformation illustrated in FIG. 15 this tailmost part of the rivet shank has reversed its direction of taper. The rear end face 36 of the tail end of the rivet shank is now slightly concave, and its inner periphery is in contact with the cylindrical surface 44 of the mandrel head. Between this position and the junction between the cylindrical surface 44 and leading tapered surface 43 of the mandrel head, the wall 32 of the rivet shank bore increases in diameter, so that there is an annular gap of elongated cross-section indicated in FIG. 15 by reference numeral 81. Along approximately half of the length of the tapered surface 43 the wall of the rivet bore is in contact with that tapered surface. The leading edge 72 of the deformation in the exterior of the rivet shank has reached a position within the rear sheet 162, whilst the narrow end of the mandrel taper face 43 is still spaced away from the plane of the rear face 167 of the rear sheet by a distance approximately equal to the thickness of that sheet.

Figure 16:
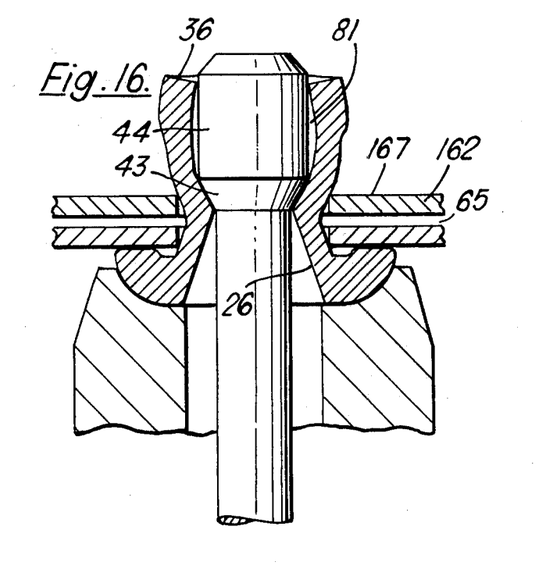

In FIG. 16, the mandrel head has advanced further, to the point where the exterior of the rivet shank has contacted the rear sheet 162 and has slightly drawn the rear sheet towards the front sheet, so that the gap 65 in FIG. 16 is slightly narrower than the gap 65 in FIG. 15. In FIG. 16, it will be seen that the rear end of the cylindrical surface 44 of the mandrel head is just outside the rear end face 36 of the rivet shank, which is still concave. The inner periphery of the rear end face 36 is still in contact with the cylindrical surface 44 of the mandrel head, and the elongated annular gap 81 is larger than in FIG. 15. The leading tapered face 43 of the mandrel head has advanced through the rivet bore so that it is adjacent the narrow end of the internal tapered face 26 in the rivet. The wide end of the mandrel head taper face 43 is still behind the plane of the rear surface 167 of the rear sheet 162.

Figure 17:
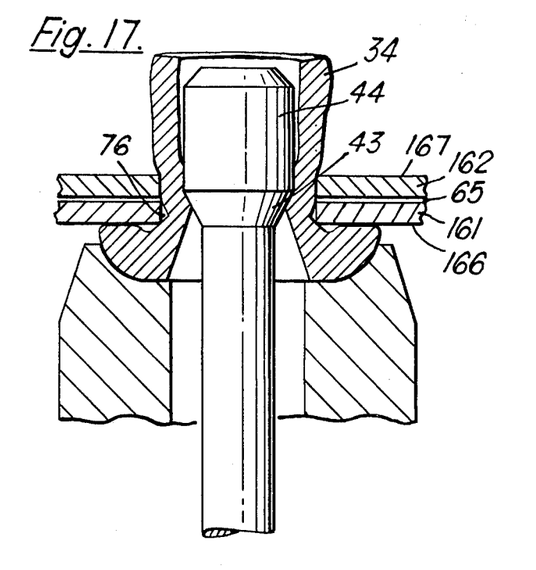

FIG. 17 shows the mandrel head advanced still further through the rivet bore, to a position where the gap 65 is smaller than in FIG. 16, but is still of appreciable thickness, so that the sheets have not yet been clenched completely together. It will be seen from FIG. 17 that the tailmost part 34 of the rivet shank has now radially expanded and increased in diameter, so that the internal diameter of the rivet bore at this position, and indeed in all positions behind the plane of the rear face 167 of the rear sheet 162, is larger than the external diameter of the mandrel head cylindrical portion 44. The explanation of this change is believed to be that the part of the rivet tail outside the rear sheet is unsupported radially, and is sufficiently stiff that, after the mandrel taper 43 has passed beyond a given zone therealong, that zone does not contract on to the mandrel head surface 44 but remains substantially straight (when considered in section) in the outwardly sloping direction which has been given to it by the mandrel taper 43. Consequently that zone of the rivet tail has an internal diameter which is greater than the maximum diameter of the mandrel head taper 43 and which is substantially retained after the mandrel head taper has passed the zone. In FIG. 17, as in FIG. 7 of the first example, there is still a small annular space 76 of triangular cross-section between the external tapered face 25 on the rivet shank adjacent the head, and that portion of the wall of the hole 163 near the front face 166 of the front sheet 161.

Figure 18:
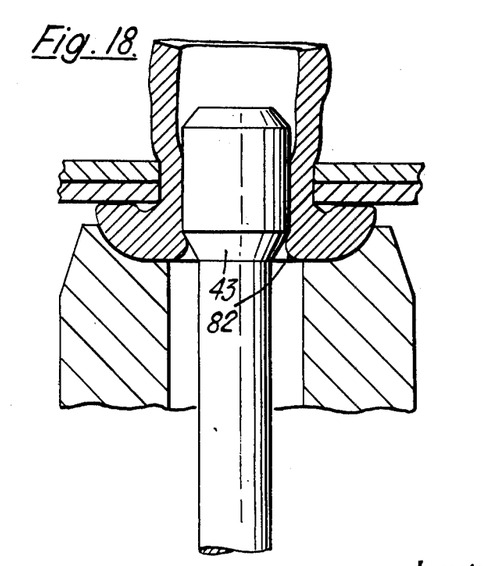

In FIG. 18 the mandrel head has advanced still further through the rivet bore, and has clenched the sheets together so that the gap between them has disappeared.

It will be seen that the flare provided by the internally tapered face 26 on the rivet has disappeared, and that there is, ahead of the tapered face 43 of the mandrel head, a small annular bulbous protrusion 82 at the headmost end of the rivet bore, comprising excess material from the rivet which has been transferred towards the head of the rivet by the passage of the mandrel. Although in FIG. 17 the outside of the rivet shank had reached the periphery of the gap 65 between the sheets around the apertures in the sheets, the advance of the mandrel head through the rivet clenches the sheets tightly together.

Figure 19:
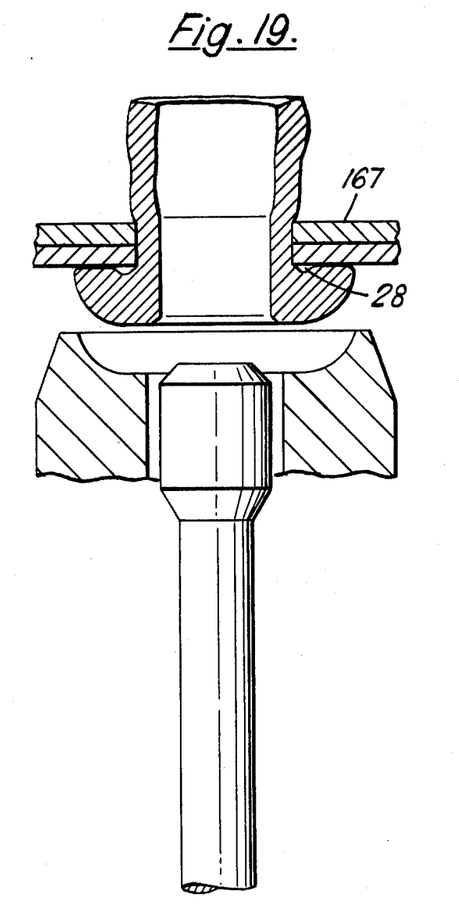

FIg. 19 illustrates the final placed configuration of the rivet of this example, in which the mandrel has been drawn clear of the rivet bore and the riveting gun removed from the mandrel head. The flare in the rivet head bore, originally defined by the internal tapered surface 26, has substantially disappeared, having been filled by material moved along the rivet shank by the passage of the mandrel head through it. The annular depression 28 on the underface of the rivet head has been reduced in size, as in the example described with reference to FIGS. 1 – 9. The portion of the rivet shank wall adjacent to the rivet head, i.e., between the remains of the shortened internal tapered surface 26, and the annular depression 28, has substantially increased in thickness and thus in strength. The deformed exterior surface of the rivet shank is firmly in contact with the walls of the holes throughout their length from the front face to the back face of the sheets. The radially enlarged blind head is in contact with the rear face 167 of the rear sheet, to securely engage the rear sheet.

It should be made clear that the material of the rivet shank which is moved from the tailward end of the shank towards the head end of the shank, referred to in connection with both FIGS. 1 – 9 and FIGS. 11 – 19, is not provided by any part of the rivet shank material being detached from the body of the shank and moved with respect to the body of the shank. What appears to happen is that the material of the rivet shank adjacent the bore 32 is all moved progressively towards the head of the rivet, the rivet shank and head remaining one integral body of metal throughout the deformation process.

The rivets of the above examples are made of an aluminium alloy containing 2% magnesium as the alloying element. They could alternatively be made from a suitable low carbon steel, and zinc plated, or from any other material of adequate ductility, although this might entail altering certain dimensions and proportions of the rivet in accordance with the different physical properties of the material.

The mandrel is made from a suitable very strong steel.

An advantage of the finished riveted joints of the above examples is that they have a high pretension (i.e., the force required to pull the riveted sheets apart), which may be as much as 100 lbs. or more.

The relationship between the thickness of the wall of the rivet shank 21, the diameter of the mandrel head 42, the angle of the mandrel head taper 43, and the diameter of the hole in the sheets in which that rivet is intended to be placed by that mandrel for optimum results, is such that, when the rivet is inserted in the hole and the mandrel head pulled through the rivet bore, there is sufficient axial shortening of the rivet shank within the hole to provide adequate pretension in the placed rivet (i.e., the force with which the placed rivet clamps together the sheets) whilst at the same time the rivet shank is expanded radially sufficiently to come into close contact with the wall of the hole throughout its length but not so much that it enters between the sheets nor provides more excess material than can be accommodated in the head flare 26.

It will be noted that the total thickness of the sheets riveted together in FIGS. 1 – 9 is about two and a half times the total thickness of the sheets riveted together in FIGS. 11 – 19, identical rivets being used in these two cases. Thus the example rivet has a considerable grip range. The largest grip (i.e., total sheet thickness) the rivet can successfully be placed in could be increased by increasing the axial length of the intermediate part 33 of the shank, i.e., increasing the dimension between the rivet head underface 29 and the rivet tail taper 37. Such a rivet could still be used to fasten thin sheets, down to the lower thickness limit set by the mechanical strength of the sheets. It will be appreciated that the ability of a single size of rivet to operate successfully over a wide grip range is of great practical importance, leading to substantial reductions in the number of different sizes which must be produced by the manufacturer and stocked by the user.

It will be noted that when the example rivet is placed in thick sheets (as illustrated in FIGS. 1 – 9), the thickened end portion 34 of the rivet tail provides extra material at the tail end of the rivet which, when deformed outwardly by the mandrel head entering the tail end of the rivet, contacts the rear face of the rear sheet relatively quickly to assist in providing quick and strong clench of the sheets (i.e., bringing of the sheets together). When the example rivet is placed in relatively thin sheets (as illustrated in FIGS. 11 – 19), this thickened end portion of the rivet is so far behind the rear sheet that it does not contact the rear sheet. Instead, contact with the rear sheet is made by a portion of the rivet shank very much nearer the head of the rivet. Accordingly, it might be possible to modify the rivet of the above examples by omitting the thickened tail end portion, possibly with a compensating increase in length of the rivet shank in a tailward direction. However, it is not certain that such a rivet would function so well as the rivets of the above examples, since it would appear that the thickened tail end portion of the shank has an effect upon the way in which the rivet deforms and in particular upon the shape of the enlarged blind head produced in the placed rivet.

The mandrel head has a taper on its leading face 43 which is very much steeper than any of which the Applicants are aware. It is believed that one advantage of this steep taper is that, since it passes from its minimum diameter to its maximum diameter within a relatively short axial distance, the wide end of the taper has substantially completed expansion of the blind head on the tail end of the rivet shank before the narrow end of the taper has appreciably expanded the part of the rivet shank opposite the gap between the sheets (this situation is apparent from FIG. 6). With a much shallower taper as used in prior art riveting mandrels, a substantial amount of material from the rivet shank is forced into the gap between the sheets (or causes the formation of such a gap if it did not previously exist).

The elongated cylindrical portion 44 of the mandrel head is believed to be advantageous, in that it supports the material of the rivet shank throughout a substantial part of the thickness of the sheets until the leading taper 43 has completed the work of deforming the rivet shank (this will be apparent if a position intermediate those illustrated in FIg. 7 and FIG. 8 is considered). This effect is believed to be beneficial in providing a strong riveted joint. However, it might be possible to utilize the beneficial effect of the steep leading taper surface without providing the relatively long cylindrical portion 44 behind it.

Figure 10:
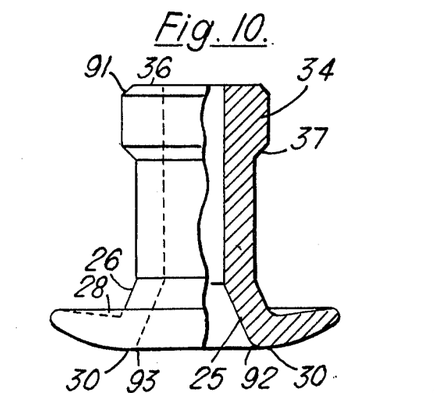
FIG. 10 illustrates a slightly modified form of rivet.

A minor modified form of rivet is shown in FIG. 10, which is partly an axial section and partly an outside elevation. It will be seen that this modified rivet has slight differences of shape to the example described above. The included angle of the internal and external taper faces 25 and 26 is 50°, and the included angle of the tapered face 37 is 90°. The thickened portion 34 at the rivet tail end is provided, at its tailward end, with a further small annular tapered face 91 of included angle 90°, joining to the flat tail end face 36. The shape of the recess 28 of the underface of the head of this example also differs slightly from the example illustrated in FIGS. 1 and 11. The internal tapered surface 26 may be joined to the head end face 30 of the rivet by means of a chamfer, as illustrated by reference numeral 92 in FIG. 10, or alternatively this chamfer may be omitted as indicted at reference numeral 93. Alternatively the chamfer may be replaced by a counterbore. The mandrel used with such a modified rivet may have the parallel portion of its head of a length less than its diameter, e.g. about two-thirds of its diameter.

Two examples of sizes of this modified form of rivet and the appropriate mandrel are as follows:-(all dimensions in inches)

| DIMENSION | EXAMPLE 1 | EXAMPLE 2 |
| --- | --- | --- |
| Diameter of rivet bore | 0.058–0.062 | 0.096–0.100 |
| Diameter of rivet shank | 0.103–0.106 | 0.154–0.157 |
| Diameter of rivet tail | 0.121–0.124 | 0.185–0.188 |
| Diameter of mandrel shank | 0.054–0.057 | 0.090–0.093 |
| Diameter of mandrel head | 0.096–0.098 | 0.139–0.141 |
| Included angle of mandrel head taper | 59°–61° | 44°–46° |
| Length of uniform diameter | | |

-continued

| DIMENSION | EXAMPLE 1 | EXAMPLE 2 |
|---|---|---|
| portion of mandrel head | 0.060–0.080 | 0.100–0.125 |
| Recommended diameter of hole in sheets | 0.1285–0.1315 | 0.1610–0.164 |

In both cases, the rivet is made of low carbon steel and is zinc plated, and the mandrel is made of alloy steel. When steel rivets are placed, it is found that the original exterior shape of the taper at the tail end of the rivet is preserved to a much greater extent than with the alloy rivets illustrated in FIGS. 9 and 19.

In all the example rivets described the bore of the rivet is of uniform diameter throughout its length. It may be that, due to the limitations of the particular process employed in manufacturing such rivets, minor irregularities occur in the surface of the bore. For instance, rivets similar to that illustrated in FIG. 10 have been manufactured with a small annular groove around the bore at a position about midway along the thickened rivet tail. These rivets perform quite satisfactorily when placed. Accordingly it is to be understood that when the term "uniform bore" or "substantially uniform bore" occurs in the appended claims, it is to be construed to include such minor irregularities.

I claim:

1. In an apparatus for joining two side-by-side metallic sheets, having aligned holes of substantially the same diameter therein, comprising in combination, a blind tubular rivet and a pullthrough mandrel for placing the rivet through said holes of said sheets for securely fastening said sheets together, the improvement comprising:

said rivet having an elongated shank, a radially enlarged head at one end of the shank and a bore extending throughout said head and said shank, said shank having a tail portion remote from said head, a cylindrical intermediate portion of substantially constant external diameter and smaller in diameter than said tail portion, and a tapering portion adjacent to said head, said bore in said tail portion and said cylindrical intermediate portion being of substantially uniform diameter, said tapering portion tapering outwardly toward said head both externally and internally such that said bore in said tapering portion progressively increases in diameter from said cylindrical intermediate portion through said tapering portion and said radially enlarged head, and said shank having a wall thickness which is substantially constant throughout said intermediate and tapering portions thereof and which is increased in said tail portion thereof, said radially enlarged head of said rivet having an annular recess formed on the side thereof facing toward said shank at the junction thereof with said externally tapered portion of said shank; and said mandrel having a stem and an enlarged head, that end of the mandrel head which faces towards said stem being in the form of a taper having an included angle of not less than about 45°, whereby said mandrel is capable of blind placing of the rivet through a pair of said metallic sheets having aligned holes which have a greater diameter than the external diameter of said cylindrical intermediate portion of said rivet shank by the pulling of the mandrel head completely through the bore of the rivet in the direction toward its head thereby to contract the rivet axially and to expand radially at least said shank part of the rivet, the material from the cylindrical intermediate portion of said rivet shank being expanded radially against the inner walls of said holes in said metallic sheets and pushed along by the mandrel head in its passage through the rivet bore to reduce the size of the tapered bore in the head of the rivet and the material from the tapering portion of said rivet head being expanded into said annular recess to increase the thickness of said tapering portion and thus its strength.

2. The improved combination set forth in claim 1, wherein the diameter of the externally tapered portion of said shank at its junction with said recess is greater than the largest diameter of said bore in said radially enlarged head of said rivet.

3. The improved combination set forth in claim 1, wherein the side of said radially enlarged head of said rivet facing toward said shank being radially outside said recess forms a flat annular surface.

4. The improved combination set forth in claim 1, wherein the tail portion of said shank of said rivet tapers steeply to the cylindrical intermediate portion thereof.

5. A blind rivet for joining two side-by-side metallic sheets having aligned holes of substantially the same diameter therein, comprising an elongated shank, a radially enlarged head at one end of the shank and a bore extending throughout the length of the rivet, the shank having a tapering portion adjacent the head which tapers outwardly towards the head, a tail portion at the end remote from said head, and a cylindrical intermediate portion between said tail portion and said tapering portion, the bore in said tail portion and said cylindrical intermediate portion of said shank being of substantially uniform diameter, the external diameter of the wall of said cylindrical intermediate portion being substantially constant and the external diameter of said tail portion being greater than that of said cylindrical intermediate portion, the taper of said tapering portion of said shank being both external and internal and such that the wall thickness of said tapering portion is substantially the same as the wall thickness of the cylindrical intermediate portion of said shank, with said bore in said tapering portion progressively increasing in diameter from said cylindrical intermediate portion through said tapering portion and said radially enlarged head, and said radially enlarged head of said rivet having an annular recess formed on the side thereof facing toward said shank at the junction thereof with said externally tapered portion of said shank, whereby blind placing of the rivet through a pair of said metallic sheets having aligned holes which have a greater diameter than the external diameter of said cylindrical intermediate portion of said rivet shank may be accomplished by pulling a mandrel head completely through the bore of the rivet in the direction toward its head thereby to contract the rivet axially and to expand radially at least said shank part of the rivet, the material from the cylindrical intermediate portion of said rivet shank being expanded radially against the walls of said holes in said metallic sheets and pushed along by the mandrel head in its passage through the rivet bore to reduce the size of the tapered bore in the head of the rivet and the material from the tapering portion of said rivet head being expanded into said annular recess to increase the thickness of said tapering portion and thus its strength.

6. A rivet according to claim 5, wherein the diameter of the externally tapered portion of said shank at its junction with said recess is greater than the largest diameter of said bore in said radially enlarged head of said rivet.

7. A rivet according to claim 5, wherein the side of said radially enlarged head of said rivet facing toward said shank being radially outside said recess forms a flat annular surface.

8. A rivet according to claim 5, wherein the tail portion of said shank of said rivet tapers steeply to the cylindrical intermediate portion thereof.

9. A rivet according to claim 5, in which the included angle of the said tapering portion is about 40° or 50°.

10. A rivet according to claim 5, in which the taper of said tail portion of said rivet is relatively steep and has an included angle in the range 45° to 100°.

* * * * *